United States Patent Office 3,336,128
Patented Aug. 15, 1967

3,336,128
PROCESS FOR COATING A PLANT NUTRIENT WITH PHENOL FORMALDEHYDE, UREA AND FURFURYL ALCOHOL
Melville J. Holik, Franklin Park, Ill., assignor to International Minerals & Chemical Corporation, a corporation of New York
No Drawing. Filed July 20, 1964, Ser. No. 384,000
10 Claims. (Cl. 71—28)

This invention relates to improvements in the field of plant nutrient compositions having slow release properties in soil. In one of its aspects the present invention relates to an improved granular fertilizer having gradual plant nutrient release properties. In another of its aspects, this invention relates to a method for the preparation of a granular fertilizer having gradual or slow plant nutrient release properties. In another of its aspects, this invention relates to an improved method for the coating or encapsulation of urea which is used as a plant nutrient or in plant nutrient compositions.

Agronomists, horticulturists, farmers and fertilizer manufacturers have long desired a fertilizer that releases plant nutrient at a controlled rate. As early as 1907 a U.S. patent was granted on an impregnating and coating process to be used in the production of a slow release fertilizer. However, it is only within the last few years that a major interest in controlled nutrient release has developed in the United States fertilizer industry, and present indications are that fertilizers with controlled or metered release of nutrients some day will find extensive use in the production of specialized crops in the U.S. Controlled release fertilizer, however, may also have a major impact on agriculture in tropical and sub-tropical regions, and in vast areas of the world where rainfall is heavy and soils are rapidly depleted of their nutrients through leaching.

In the past, controlled release of nutrients has normally been sought by altering the chemical or physical characteristics of the fertilizer material. Examples of previous accomplishments using these techniques can be seen in the widely used urea-formaldehyde resin nitrogen materials, chelated micronutrients and micronutrients incorporated into glass frits. Continued research on any compounds with reduced solubility has led to the development of oxamide and the metal ammonia phosphates as fertilizers with controlled release of nutrients. The release of nutrients from both of these compounds is a function of particle size.

Recently there has been a surge of research activity on controlled release of plant nutrients by covering fertilizer granules with water-resisting or impermeable coatings. Materials investigated as coating agents include various plastics or resin substances such as polyethylene, acrylic resins, and vinyl acetate, waxes and paraffin compounds, asphaltic mixtures and sulphur. The principal problem is the provision of a coating which presents optimum resistance to moisture and other environmental conditions existing in soil.

When compared to altering the chemical or physical characteristics of the fertilizer compound, coating for slow release has a distinct advantage. Coating allows the manufacturer to use fertilizer materials that are common and readily available. Fertilizer ratios can be formulated in almost any nutrient combination desired. Needed micronutrients and secondary elements can be combined with primary nutrients. Further advantages of coated fertilizer material are a slow release of plant nutrients over a period of several months which prevents leaching losses early in the growing season with subsequent deficiencies as the crop approaches maturity. Luxury absorption by plants during the first flush of growth is also reduced and more efficient use of nutrients such as nitrogen and potassium is thereby obtained. There is also a reduction or elimination of settling damage due to contact with high local concentrations of soluble fertilizer materials. Further, there is reduced "burning" or fertilizer injury to growing crops such as grasses and legumes when high application rates are used as top dressings. Also physical properties of the fertilizer are improved. Handling by the consumer is easier and cleaner and there is less corrosion to the machinery and storage stability is better than with uncoated materials.

A major problem of coated fertilizer is in manufacturing the product. Coating uniformity around each fertilizer particle is often difficult to obtain with large scale production. Optical examination of fertilizer particles usually shows a rough, pitted surface with extruding crystals. Such granules have been extremely difficult to cover with coating materials. A very small imperfection in the coating allows the salts to diffuse rapidly in the moist soil. Single salt fertilizers such as potassium chloride or ammonium nitrate or sulfate are also difficult to coat unless pelletized in some fashion. In view of the water solubility of most N-P-K plant nutrient materials, the provision of water-resistant coating therefor from an aqueous polymer system presents a rather difficult problem. In the past this problem has been avoided by the employment of non-aqueous polymer systems which, however, present problems of their own. A particular problem of extreme severity exists in the case of urea, which is a very common fertilizer material used to provide nutrient nitrogen. This problem resides in the fact that urea is extremely soluble in water and is either soluble in or reacted with practically all of the common non-aqueous solvents which are used in conventional polymer substances. Further, non-solvent polymer substances having any effectiveness as a coating usually require high temperatures to effect either the coating by rolling in the syrup or by, in situ, surface polymerizations. Such high temperatures, to wit, above about 90° C., result in the conversion of urea to biuret which has little, if any, value as a nitrogen nutrient source.

In accordance with the present invention I have developed an improved coating which is applicable to all water soluble granular plant nutrient compositions, but which is particularly applicable to urea. I have also developed an improved method for applying water resistant polymer coatings to water soluble plant nutrient compositions generally, but which is particularly adapted to methods involving, in situ, polymerizations involving the use of an aqueous mineral acid as a catalyst or otherwise involving the use of an aqueous system. One of the major benefits accruing from my coating and method is the ability to effect a worthwhile coating from an aqueous system at a low temperature. This advantage has major significance in the coating of urea used as a major plant nutrient source.

It is, therefore, an object of the present invention to provide improvements in the art of compositions capable of releasing plant nutrients at a controlled rate.

It is a further object of this invention to provide an improved water resistant polymer coating for granular water soluble plant nutrient compositions.

It is still another object of this invention to provide an improved method for coating water resistant polymer coatings on granular water soluble plant nutrient compositions.

It is a further object of this invention to provide an improved method for coating water soluble granular material with polymer coatings using aqueous monomer or prepolymer-catalyst systems.

It is a specific object of this invention to provide an improved coating for, and an improved method of, applying water resistant polymer coatings on granular urea through the employment of an, in situ, aqueous mineral acid catalyzed polymerization reaction.

Additional objects of the present invention will be apparent from the description which follows.

Generally described, in a major aspect, the present invention involves a process for the preparation of a plant nutrient composition having slow release properties in soil which comprises progressively forming, at a temperature in the range between about 50 and about 90° C., on the surface of a granular water soluble plant nutrient material, from about 5 to about 30% by weight of a water resistant polymer coating by a series of aqueous mineral acid-catalyzed polymerization reactions between phenol, formaldehyde, urea and furfuryl alcohol, wherein the proportion of furfuryl alcohol to the other reactants is progressively increased as the polymerization reactions proceed so that the outermost portion of the water resistant polymer coating contains a higher proportion of furfuryl alcohol than the innermost portion. While it is within the scope of my invention to carry out the polymerization reactions by bringing the individual monomers and catalyst together, in the proper proportions, on the surface of the material to be coated, a preferred procedure is to pre-mix the monomers to insure uniform blending and contact of the reactants. My process also contemplates, as a preferred modification, pre-reaction of the monomers into prepolymers which are blended, and then further reacted and cured on the surface of the base fertilizer material. Generally, the phenol is pre-reacted with a portion of the formaldehyde to form a phenol-formaldehyde prepolymer which is further reacted with additional formaldehyde, urea, and furfuryl alcohol. Also, part of the urea and part of the formaldehyde can be pre-reacted to form methylol ureas. Part of the formaldehyde can also be pre-reacted with part of the furfuryl alcohol. However, monomeric urea, formaldehyde and furfuryl alcohol are usually also employed as primary monomeric reactants. It will be appreciated that monomeric formaldehyde may be supplanted by equivalent para-formaldehyde in the prepolymer formation.

Of particular significance in the present invention is the inclusion in the polymerization reactant medium, especially the polymerization reactant medium which is first brought into contact with the base water soluble plant nutrient material, of a small amount of a proteinaceous material, and preferably selected from the group consisting of casein, albumin, zein and gelatin. The proteinaceous material is believed to provide a sol or gel-like property to the reaction medium thereby providing protection to the water soluble base against attack, dissolution, or the like, by the water and/or acid present in the reaction system. It should be pointed out that this aspect of my invention has general applicability to coating water soluble base materials from any mineral acid catalyzed aqueous polymerization systems, and not just the specific systems described herein. While this feature is of less significance when the plant nutrient substrate is a mixed N-P-K fertilizer material, it is of particular importance when the substrate material is a granular urea. It should be noted, however, that the proteinaceous material does not prevent completely the urea in the base prill from entering into the polymerization reaction providing the water resistant coating. While the proteinaceous material can be incorporated into the polymerization reaction medium by conventional procedures, a preferred method is to formulate the aqueous mineral acid catalyst as a separate system and incorporate therein the proteinaceous material. In a preferred procedure, casein with a very small amount of alkali, such as sodium hydroxide, is dispersed in water with some warming and stirring. To the casein solution there is added urea to which, after the solution is clear, there is added a mineral acid, preferably phosphoric acid and hydrochloric acid. The thus-prepared solution is then applied directly to the plant nutrient base or, alternately, first admixed with other reactants.

The preferred procedure for carrying out the method of the present invention is to tumble the fertilizer base material, as in a rotating drum, while cyclicly spraying onto the tumbling fertilizer base granules, from 2 or more nozzles, the materials interacting to form the polymer coating. The process takes place at a temperature in the range between about 50 and about 90° C. and is continued over a period of time in a number of cycles to provide from about 5 to about 30% by weight of water resistant polymer coating in the final product. The temperature is controlled by addition of heat by external means, or by the removal of excess heat of reaction. The preferred product has about 20 to 25% by weight of coating. When the base plant nutrient material being coated is urea, it is extremely important that the temperature not exceed about 90° C. and preferably is about 75° C. With other nutrient base materials, such as mixed N-P-K formulations, the temperature may be considerably higher, up to about 105° C. However, this is not preferred since it considerably accelerates the rate of curing of the polymer coating to the probable detriment of the reaction as a whole. Further, especially with respect to the initial application of polymer, higher temperatures can interfere with the protective action of the proteinaceous material. During the course of applying the coating, the proportion of the reactants, to wit, phenol, formaldehyde, urea and furfuryl alcohol, together with the aqueous mineral acid catalyst, are varied in such a way that the proportion of the furfuryl alcohol in the outermost portion of the polymer coating is greatest. I have found that the initial polymer coat need not contain any furfuryl alcohol. The presence of furfuryl alcohol in progressively increasing proportions has been found to contribute greatly to the water resistance of the final polymer coating. Water resistance is also improved by the inclusion in the polymerization reaction medium of a phenol-formaldehyde prepolymer. A further benefit of such a prepolymer is improved processing through the formation of intermediate smooth glossy coatings.

The present process can be carried out either on a batch basis or a continuous basis. If carried out batchwise, the preferred procedure is to tumble the base nutrient material in a rotating drum and to cyclicly spray the liquid reactant materials on the particles in a series of polymerization reactions using basically the same ingredients in varying proportions in a series of coating steps. However, it is also possible to carry out the method on a continuous basis by using an elongated rotating drum provided with a series of spray nozzles from which the reactant materials in selected proportions are sprayed onto the tumbling material as it passes by. In addition to temperatures and reactant proportions, the size of the drum, inclination, and speed of rotation are chosen to provide the final product with the desired proportion of coating. It is also desirable that the reactants be applied at a reasonably uniform rate with intermittent opportunity for curing so as to avoid mushiness, sticking and agglomeration. The adjustment of these variables is reasonably simple and within the skill of the ordinary worker. The time required to produce the desired coating will, of course, vary with the percentage of coating applied, the nature of the vessel employed and the speed of rotation. It will be appreciated that agitation by rotation must not be so severe as to interfere with the structural integrity of the base granule.

The polymerization reactions are preferably effected by pre-combining the monomers and catalyst into a minimum of two separate solutions which are sprayed against one another over the tumbling bed of base nutrient material. One preferred procedure is to pre-react phenol and formaldehyde in a molar ratio of about 1.5 moles of formaldehyde per mole of phenol to form a viscous prepolymer product. Such a phenol-formaldehyde prepolymer is a commercial product typically used in the field of foundry sand binders, and is available under the trade name PF-69 from Aristo International. In general, this phenol-formaldehyde prepolymer is prepared by heating mixtures of phenol and formaldehyde in the proper molar proportions in the presence of a very small amount of sodium carbonate to a temperature of about 85° C. for a period of about 1½ hours. Variations in the molar ratios of phenol and formaldehyde can be employed, viz, from about 1 to about 1.8 moles of formaldehyde per mole of phenol. However, higher ratios of formaldehyde tend to promote greater viscosity and cross-linking which make handling of the prepolymer difficult.

It is also preferred to pre-prepare the aqueous mineral acid catalyst into a solution having incorporated therein the proteinaceous material mentioned hereinabove, preferably casein. A preferred catalyst solution is prepared by dispersing about 6.5 parts by weight of casein in about 25.3 parts of warm water to which about 0.7 part of 50% caustic has been added to promote dispersion. After dispersion of the casein in water has been effected, about 22.0 parts of urea are added and stirring continued until a clear solution is obtained. When this occurs 26.0 parts of 85% $H_3PO_4$ and 19.5 parts of 35% HCl are added. The thus-prepared catalyst-casein-urea solution can be used alone or in admixture with phenol-formaldehyde prepolymer. A preferred procedure is to prepare, as one solution, a mixture containing 30% by weight of the catalyst solution above described, 45% of the phenol-formaldehyde prepolymer above described, and 25% by weight of additional urea. These ingredients can be readily mixed to form a clear solution which can be sprayed against additional formaldehyde in the form of commercial formalin in a first spray coating cycle of polymerization reactions until approximately about 2 to about 8% by weight of the base coat is accomplished. In the second polymerization reaction 40% of the mixture containing the acid catalyst solution, phenol-formaldehyde prepolymer and urea, is mixed with about 60% by weight of furfuryl alcohol to form a single pre-mixed solution which is then cyclicly sprayed against additional formaldehyde. The second spray coating cycle of polymerization reactions proceeds until about 5% to about 18% by weight of total coating on the base material is obtained. In the third spray coating cycle of polymerization reactions additional furfuryl alcohol is added either to the 40-60 mixture described hereinabove or to the formalin and the reactants sprayed cyclicly on to the pre-coated granules until a total polymer coating of approximately 5 to about 30% by weight of total coating exists.

In general, the individual molar ratios of the ingredients in each of the series of polymerization reactions is as set forth in the following table:

TABLE I

|  | Coat I, mols | Coat II, mols | Coat III, mols |
| --- | --- | --- | --- |
| Phenol (HCHO combined) | 1.0 | 1.0 | 1.0 |
| HCHO (Phenol combined) | 1-1.8 | 1-1.8 | 1-1.8 |
| Free HCHO | 6.5-13.5 | 11-21.5 | 5-8.8 |
| Urea | 1-2 | 1-2 | 1-2 |
| Free Furfuryl Alcohol |  | 3-6 | 8-15 |
| 100% Phosphoric Acid | .1-.5 | .1-.5 | .1-.5 |
| 100% Hydrochloric Acid | .1-.5 | .1-.5 | .1-.4 |
| Casein (Wt. percent) | .5-2.0 | 0.4-1 | 0.3-1 |

A typical composition of total polymer from the three reactions has the following composition:

| | Mols |
| --- | --- |
| Phenol (HCHO combined) | 1.0 |
| HCHO (Phenol combined) | 1.5 |
| Urea | 1.67 |
| Free HCHO | 14.6 |
| Free Furfuryl Alcohol | 5.7 |
| 100% Phosphoric Acid | .2 |
| 100% Hydrochloric Acid | .185 |

As an alternate procedure for the final coat, the furfuryl alcohol can be pre-reacted with a portion of the formaldehyde.

As a general measure of the water resistance of polymeric coatings for fertilizer materials, the conventional procedure is to immerse the polymer coated plant nutrient composition in water and to determine the percentage of intact particles after a certain period of time. Obviously, the higher percentage of intact particles after the longer period of immersion time is a direct reading on the water resistance of the material. The standard procedure for testing of this type is to submerge 10 grams of a coated material in 100 ml. of distilled water and examine the coated granules periodically under low magnification.

The following examples will illustrate the underlying principles of the present invention and are not to be construed as unduly limiting thereof.

EXAMPLE I

In this example a batch of 25 lbs. of urea prills screened to a mesh size of −10 +14 were coated in a small size rotating drum, in the general shape of a cement mixer, provided with 2 spray nozzles and a blower heater. The drum was rotated at an average rate of about 28 revolutions per minute during the entire coating procedure.

The reactants were pre-mixed and partly pre-reacted prior to the actual coating step. A phenol-formaldehyde prepolymer was prepared by mixing 0.5 mole of phenol with 0.75 mole of formaldehyde as paraformaldehyde in the presence of a small amount of sodium carbonate (0.3 gram) at a temperature of about 85° C. for about 1½ hours. The clear yellow-orange viscous product is typical of the resol resin used and is the same as that prepared and sold commercially under the trade name PF 69.

An initial mineral acid solution was prepared as described in the specification hereinbefore and has the following composition:

| | Percent |
| --- | --- |
| Casein | 6.5 |
| 50% NaOH | 0.7 |
| $H_2O$ | 25.3 |
| Urea | 22.0 |
| $H_3PO_4$ (85%) | 26.0 |
| HCl (35%) | 19.5 |

A single solution was then prepared from the phenol-formaldehyde prepolymer and mineral acid catalyst solution together with urea to form a catalytic solution (designated 3558-45) having 30% by weight of the mineral acid catalyst solution, 25% by weight urea and 45% by weight of phenol formaldehyde (PF 69).

The 25 lb. batch of urea prills was coated in a series of three steps as follows:

*Coating procedure for urea prills*

The coating sequence for the 25 lb. batch (3623-48) was as follows:

Heated air from blower-heater only.

Step I:

| | Ml. |
| --- | --- |
| (3558-45) | 350 |
| Formalin | 1400 |

Applied in one hour in seven spray cycles, the two solutions being sprayed simultaneously. Temp. 69-65° C.

Step II:

| | Ml. |
| --- | --- |
| (3558-45) ........40%⎱<br>Furfuryl alcohol....60%⎰ | 750 |
| Formalin | 2000 |

Applied in two hours in ten spray cycles, the two solutions being sprayed simultaneously. Temp. 73-67° C.

Step III:

| | | Ml. |
|---|---|---|
| (3558–45) | 40% | 1335 |
| Furfuryl alcohol | 60% | |
| Furfuryl alcohol | 50% | 2650 |
| Formalin | 50% | |

Applied in two hours in fifteen spray cycles with simultaneous spraying. Temp. 75–70° C.

The finished prills were free-running and dry with practically no agglomeration. The coating was glossy and dark-brown in color. About five hours were required to make this batch.

TABLE II.—ANALYSIS AND PERFORMANCE OF LARGE BATCH 3623–48 COATED UREA

| Sample | Percent N | Percent Coating* | Immersion Time | Percent Intact |
|---|---|---|---|---|
| Step I | 44.4 | 5.9 | 45 min | 0 |
| Step II | 41.9 | 11.2 | 2 hrs. 30 min | 40 |
| Step III | 39.7 | 19.1 | 66 hrs | 48 |

*Water insoluble material.

Good water resistance of almost three days, 50% remaining intact, at high N content resulted.

TABLE III.—WATER IMMERSION RESISTANCE OF COATED UREA PRILLS BATCH NO 3623–48. 10 G. IN 100 ML. WATER.

| Time, hrs.: | Percent intact |
|---|---|
| 5.5 | 100 |
| 15.0 | 84 |
| 22.0 | — |
| 30.0 | — |
| 35 | 72 |
| 42 | 51 |
| 46 | — |
| 53 | — |
| 59 | 50 |
| 83 | 20 |
| 110 | 4 |

Percent insoluble coating ___ 19
N analysis ___ 39.7

EXAMPLE II

In this example a 25 lb. batch of urea prills of −10 +14 mesh were coated using the equipment described for Example I and the solutions as described also in Example I. The procedure was as follows:

Heated air from blower-heater only was used.

Step I:

| | Ml. |
|---|---|
| (3558–45) | 500 |
| Formalin | 1980 |

Applied in one hour and forty-five minutes in nine spray cycles, the two solutions being sprayed simultaneously. Temp. 68–73° C.

Step II:

| | | Ml. |
|---|---|---|
| (3558–45) | 40% | 1880 |
| Furfuryl alcohol | 60% | |
| Formalin | | 4610 |

Applied in four hours in twelve spray cycles, the two solutions being sprayed simultaneously. Temp. 61–72° C.

Step III:

| | | Ml. |
|---|---|---|
| (3558–45) | 40% | 1440 |
| Furfuryl alcohol | 60% | |
| Furfuryl alcohol | 50% | 2880 |
| Formalin | 50% | |

Applied in two hours and forty minutes in fifteen spray cycles with simultaneous spraying.

The product had the properties shown in the following table.

TABLE IV.—WATER IMMERSION RESISTANCE OF COATED UREA PRILLS BATCH NO. 3623–45. 10 G. IN 100 ML. WATER

| Time, hrs.: | Percent intact |
|---|---|
| 5.5 | 100 |
| 15.0 | — |
| 22.0 | 88 |
| 30.0 | 84 |
| 35 | — |
| 42 | — |
| 46 | 71 |
| 53 | 56 |
| 59 | — |
| 83 | 20 |
| 110 | 7 |

Percent insoluble coating ___ 25
N analysis ___ 37.6

EXAMPLE III

In this example a 50 lb. batch of urea prills of −10 +14 mesh were coated using the equipment described for Example I and the solutions as described also in Example I. The procedure was as follows:

Heated air from blower-heater was used.

Step I:

| | Ml. |
|---|---|
| (3558–45) | 700 |
| Formalin | 2800 |

Applied in two hours and forty minutes in seven spray cycles, spraying simultaneously. Temp. 68–69° C.

Step II:

| | | Ml. |
|---|---|---|
| (3558–45) | 40% | 2275 |
| Furfuryl alcohol | 60% | |
| Formalin | | 5350 |

Applied in one hour and fifteen minutes in five spray cycles, spraying simultaneously. Temp. 70–74° C.

Step III:

25 lbs. of Step II coated prills were used. A final coat was applied using only one solution instead of the separate components. This one solution (3715–5) was composed of:

| | | Part |
|---|---|---|
| 3558–45 | 40% | 1 |
| Furfuryl alcohol | 60% | |
| Methanol | | 1 |
| A prepolymer formed from the reaction of 2 mols of furfuryl alcohol with 2.5 mols of paraformaldehyde in the presence of 1% morpholine as catalyst at 120° C. (designated 3702–10) | | 1 |

The methanol was necessary to slow polymerization to provide pot-life during spraying.

When the single solution was sprayed on the pre-coated prills to finish at 83° C. curing temperature, the coating progressed smoothly by the application of 4850 ml. of 3715–5 in 29 cycles of application and curing during four hours.

The product had the properties shown in the following table.

TABLE V

| | Percent |
|---|---|
| N | 37.3 |
| Coating | 24.8 |

| Water immersion Time, hrs.: | Percent Intact |
|---|---|
| 18 | 72 |
| 42 | 50 |
| 66 | 38 |
| 89 | 35 |
| 1 week | 6 |

EXAMPLE IV

In this example a 25 lb. batch of a mixed fertilizer, −10 +14 mesh size, having a 23–12–6 N-P-K ratio was employed. In this example, also, it was necessary to increase the supplement of urea and furfuryl alcohol in the initial coat since a different surface exists in this case, i.e. ammonium nitrate in place of urea, and the potassium and phosphate components. Preliminary work showed that only one initial coat followed by one final coat was necessary. The initial coat was 3715–5A:

| | Parts |
|---|---|
| N-Dure (methylol urea solution—60% HCHO, 25% urea, 15% $H_2O$) | 1 |
| Formalin | 1 |
| Furfuryl alcohol | 1 | which was sprayed (1500 ml.) against 1000 ml. of the 40/60 monomer-catalyst solution employed in Step II of Example I at 80° C., curing in ten cycles. One hour and fifteen minutes were required to process.

The second final coat was the single solution 3715–5 used in the final coating of the urea batch described in Step III of Example III. Forty spray cycles at 80–85° C. curing temperature were used requiring 6 hours.

The product was brown-colored, analyzing 19, 13.8, 6.5, percent N, percent $P_2O_5$, percent $K_2O$ with a percent insoluble coating by gravimetric procedure of 22.6%. It had the properties described below.

TABLE VI

| Water immersion test time, hrs.: | Percent intact |
|---|---|
| 18 | 100 |
| 42 | 100 |
| 66 | 82 |
| 89 | 59 |
| 1 week | 18 |

EXAMPLE V

This example illustrates the use of a proteinaceous material (casein) in coating a water soluble plant food material (urea) by means of a surface polymerization catalyzed by aqueous mineral acid ($H_3PO_4$ and HCl) utilizing aqueous components or monomers (aqueous polyethylene emulsion, formalin, aqueous furfuryl alcohol and aqueous methylol urea).

In this example a batch of 25 lbs. of urea prills screened to a mesh size of −10 +14 were coated in a small size rotating drum, in the general shape of a cement mixer, provided with two spray nozzles and external heat supplied by radiation from a Chromalox strip heater and encircling infra-red lamps. The drum was rotated at an average rate of about 28 revolutions per minute during the entire coating procedure.

A mineral acid solution was prepared of the following composition.

3436–43:

| | Percent |
|---|---|
| Casein | 6.5 |
| 50% NaOH | 0.7 |
| $H_2O$ | 25.3 |
| Urea | 22.0 |
| $H_3PO_4$ (85%) | 26.0 |
| HCl (35%) | 19.5 |

A second solution was prepared (3525–13C) from an emulsion of polyethylene wax and aqueous methylol urea by mixing 20% of the wax emulsion with 80% of the methylol urea solution. The emulsion was prepared by heating

| | G. |
|---|---|
| Polyethylene wax (Allied 629) | 40 |
| Oleic acid | 8 |
| Morpholine | 5 | to 130° C. and adding to 200 g. water at 95° C. under agitation, forming a translucent stable emulsion.

Twenty parts of this emulsion with eighty parts of methylol urea (Allied UF–85 or N-Dure, 60% urea, 25% formaldehyde, 15% water) formed the 3525–13C solution.

Coating precedure for urea prills

Step I:

| | Ml. |
|---|---|
| 3436–43 | 255 |
| 3525–13C | 1265 |

Applied in fifteen spray and cure cycles in two hours and twenty minutes. Temperature 65–70° C. Dry, free-running white coated prills.

Step II:

| | Ml. |
|---|---|
| 3436–43 | 1265 |
| 80% furfuryl alcohol / 20% Formalin | 2970 |

Applied in eleven cycles in four hours and twenty minutes. Temp. 55–67° C. Free cascading, shiny brown particles.

Step III:

| | Ml. |
|---|---|
| 3436–43 | 240 |
| 3525–13C | 1320 |

Applied in six cycles in one hour and a half. Temp. 59–66° C.

Step IV:

| | Ml. |
|---|---|
| 3436–43 | 1020 |
| 80% furfuryl alcohol / 20% Formalin | 2915 |

Applied in eleven cycles in two hours. Temp. 61–66° C. Dry, glossy discrete black coated prills.

The product had the properties shown in the following table.

TABLE VII.—COATED UREA (3508–34) ANALYSIS AND WATER RESISTANCE

| | Percent |
|---|---|
| N | 35.5 |
| Coating | 32.5 |

| Water immersion test, time, hrs.: | Percent intact |
|---|---|
| 3 | 100 |
| 7.5 | 70 |
| 9.5 | 20 |
| 10.75 | 9 |

While this invention has been described and exemplified in terms of its preferred modifications, those skilled in the art can appreciate that variations can be made without departing from the spirit and scope of the invention.

The embodiments of the invention in which an exclusive property or privilege is claimed are defined as follows:

1. A process for the preparation of a plant nutrient composition having slow release properties in soil which comprises progressively forming, at a temperature in the range between about 50 and about 90° C., on the surface of a granular water-soluble plant nutrient material from about 5 to about 30% by weight of a water resistant polymer coating by a series of mineral acid-catalyzed aqueous polymerization reactions between phenol, formaldehyde, urea and furfuryl alcohol, the proportion of furfuryl alcohol to the other reactants being progressively increased so that the outermost portion of said water resistant polymer coating contains a higher proportion of furfuryl alcohol than the innermost, the first of said polymerization reactions having present in the reaction medium a proteinaceous material selected from the group consisting of casein, albumin, zein and gelatin.

2. A process for the preparation of a plant nutrient composition having slow release properties in soil which comprises progressively forming at a temperature in the range of about 50 to about 90° C., on the surface of a granular water-soluble plant nutrient material from about 5 to about 30% by weight of a water resistant polymer coating by a series of mineral acid-catalyzed aqueous polymerization reactions, the first of said polymerizations having present in the reaction medium a proteinaceous material selected from the group consisting of casein, albumin, zein and gelatin, and involving the reaction between a liquid prepolymer of phenol and formaldehyde, urea, and additional formaldehyde, the second of said polymerizations involving the reaction between a liquid phenol-formaldehyde prepolymer, urea, furfuryl alcohol, and additional formaldehyde; and a third polymerization reaction between a liquid phenol-formaldehyde prepolymer, urea, furfuryl alcohol, and additional formaldehyde, the proportion of furfuryl alcohol in said third polymerization reaction being greater than the proportion of said furfuryl alcohol being employed in said second reaction.

3. A process for the preparation of a plant nutrient composition having slow release properties in soil which comprises progressively forming on the surface of a granular water-soluble plant nutrient material, at a temperature in the range between about 50 and about 90° C., from about 5 to about 30% by weight of a water resistant polymer coating composition in a series of mineral acid-catalyzed aqueous polymerization reactions, the first in said series having present in the reaction medium casein and involving the reaction between a liquid phenol-formaldehyde prepolymer having a mole ratio of phenol to formaldehyde of about 1:1.5, urea, and formaldehyde; the second polymerization reaction involving the reaction between the phenolformaldehyde prepolymer above described, urea, formaldehyde and furfuryl alcohol; and a third polymerization reaction involving the same reactants as described for the second polymerization reaction but employing a higher proportion of furfuryl alcohol.

4. A process according to claim 1 wherein the granular water-soluble plant nutrient material is prilled urea.

5. A process according to claim 1 wherein the granular water-soluble plant nutrient material is a granular mixed fertilizer plant food.

6. A process according to claim 3 wherein the granular water-soluble plant nutrient material is prilled urea.

7. A process according to claim 3 wherein the granular water-soluble plant nutrient material is a granular mixed fertilizer plant food.

8. The product produced in accordance with the process of claim 1.

9. In a process for the preparation of a plant nutrient composition having slow release properties in soil wherein there is formed on the surface of a granular water-soluble plant nutrient material a water resistant polymer coating by a mineral acid-catalyzed aqueous polymerization reaction, the improvement which comprises incorporating into the polymer reaction system a small amount of a proteinaceous material selected from the group consisting of casein, albumin, zein and gelatin.

10. A process according to claim 9 wherein the proteinaceous material is present in the range from about 0.5 to about 2.0 weight percent of the total reaction mixture.

References Cited

UNITED STATES PATENTS 2,945,322   6/1960   Gaeth et al. _____ 71—28 X
3,233,518   12/1965   Hansen _____ 71—28 X DONALL H. SYLVESTER, *Primary Examiner.*

R. BAJEFSKY, *Assistant Examiner.*